(12) United States Patent
Takeuchi et al.

(10) Patent No.: US 7,503,374 B2
(45) Date of Patent: Mar. 17, 2009

(54) SUNSHADE ACTUATION DEVICE

(75) Inventors: Kouichi Takeuchi, Kariya (JP); Akihiro Tamaki, Toyota (JP); Yeong-Hak Yoo, Seoul (KR)

(73) Assignees: Toyota Boshoku Kabushiki Kaisha, Aichi (JP); BOS GmbH & Co. KG, Ostfildern (DE)

( * ) Notice: Subject to any disclaimer, the term of this patent is extended or adjusted under 35 U.S.C. 154(b) by 214 days.

(21) Appl. No.: 11/435,687

(22) Filed: May 18, 2006

(65) Prior Publication Data

US 2006/0260771 A1   Nov. 23, 2006

(30) Foreign Application Priority Data

May 23, 2005   (JP) .............................. 2005-150212

(51) Int. Cl.
*B60J 3/00* (2006.01)
(52) U.S. Cl. ............................. 160/370.22; 160/370.21; 160/370.23; 296/97.4; 296/97.8
(58) Field of Classification Search ............ 160/370.22, 160/370.21, 370.23, 31, 265, 309, 310, 274; 296/97.4, 97.8
See application file for complete search history.

(56) References Cited

U.S. PATENT DOCUMENTS

| | | | | |
|---|---|---|---|---|
| 3,973,503 | A * | 8/1976 | Parker et al. ............. | 104/172.2 |
| 4,246,847 | A * | 1/1981 | Chapman et al. ......... | 104/172.2 |
| 4,979,775 | A * | 12/1990 | Klose ........................ | 296/97.1 |
| 5,136,795 | A * | 8/1992 | Rosenberg ................. | 37/233 |
| 6,047,762 | A * | 4/2000 | Anderson ............... | 160/370.22 |
| 6,347,825 | B2 * | 2/2002 | Seel et al. .................. | 296/97.8 |
| 6,427,751 | B1 * | 8/2002 | Schlecht et al. ........ | 160/370.22 |
| 6,656,065 | B2 * | 12/2003 | Nye ........................... | 473/481 |
| 6,695,381 | B2 * | 2/2004 | Schlecht et al. ............ | 296/97.4 |
| 6,840,562 | B2 * | 1/2005 | Schlecht et al. ............ | 296/97.9 |
| 6,910,518 | B2 * | 6/2005 | Zimmermann et al. . | 160/370.22 |
| 7,013,946 | B2 * | 3/2006 | Beck et al. ............. | 160/370.22 |
| 7,316,440 | B2 * | 1/2008 | Walter et al. ............. | 296/37.16 |
| 7,347,246 | B2 * | 3/2008 | Ayran ..................... | 160/370.22 |
| 7,364,215 | B2 * | 4/2008 | Kim .......................... | 296/97.4 |
| 2001/0017194 | A1 * | 8/2001 | Schlecht et al. ........ | 160/370.22 |
| 2001/0022218 | A1 * | 9/2001 | Schlecht et al. ........ | 160/370.22 |

(Continued)

FOREIGN PATENT DOCUMENTS

DE   198 26 537   * 12/1999

(Continued)

*Primary Examiner*—Katherine W Mitchell
*Assistant Examiner*—Jaime F Cardenas-Garcia
(74) *Attorney, Agent, or Firm*—Wenderoth, Lind & Ponack, L.L.P.

(57) ABSTRACT

A winder is provided near a quarter window of a rear door. A shade member is drawably mounted about the winder. A connecting piece is connected to a drawing arm and mounted to the rear portion of the shade member. A shoe is mounted to a bottom end of the drawing arm. The shoe engages with a regulatory groove extending in a drawing direction of the shade member. A driving cable is connected to the shoe. The shade member can be drawn out across the window by the drawing arm via the sending out of the driving cable by an operating mechanism. Since the regulatory groove extends substantially in a circle, when the shoe moves through engagement with the regulatory groove, the connecting piece connected to the drawing arm pivots relative to the shoe.

11 Claims, 10 Drawing Sheets

U.S. PATENT DOCUMENTS

2001/0038224 A1* 11/2001 Seel et al. ............ 296/97.8
2003/0094249 A1* 5/2003 Zimmermann et al. . 160/370.22
2004/0144501 A1* 7/2004 Oskam et al. .......... 160/173 R
2006/0108767 A1* 5/2006 Susko ................ 280/253
2008/0006373 A1* 1/2008 Lin .................... 160/321

FOREIGN PATENT DOCUMENTS

JP      2003-182358      7/2003

* cited by examiner

SUNSHADE ACTUATION DEVICE

BACKGROUND OF THE INVENTION

1. Field of the Invention

The present invention relates to a sunshade actuation device that opens and closes a screen for covering a window.

2. Description of the Related Art

There exists conventional technology concerning a sunshade actuation device for the opening and closing of a sunshade for covering a vehicle window (e.g., refer to Germany Patent No. 19826537). This sunshade includes a pair of guide rails that have a non-parallel mutual relationship in a lower part of a vehicle window, and an arm member, which is equipped with respective engaging parts engaged with the pair of guide rails and extends upwards to be connected to a screen. The screen can be drawn out to cover the window. Since the arm member slides in a fore-and-aft direction via a cable in the state of engaging with the guide rails, the screen connected to the cable is drawn out from a winding device. Therefore, it is possible to cover and uncover the window. Here, since the pair of guide rails has a non-parallel mutual relationship, a predetermined angle is formed between the guide rails. The arm member, which moves while engaged with the pair of guide rails, pivots. As a result, it is possible for the drawing out dimension of the screen to be longer than the corresponding sliding amount dimension of the arm member.

By the way, it is readily appreciated that it is desirable for a part mounted in a vehicle to be small and lightweight in order to avoid interfering with other component members or increasing the overall weight of the vehicle. In particular, since restrictive conditions regarding the loading of a vehicle are relieved when components are small and lightweight, the freedom of design increases. In addition, it is desirable to make a device multi-functional.

In the conventional technology sunshade actuation device, since the arm member slides while engaging with the pair of guide rails, which have a predetermined angle there between, it is not realistically possible to provide another component in the area between the guide rails. As a result, this area becomes a wasted or dead space.

When making the arm member pivot to a large degree, it is necessary to alter the pair of guide rails into a relationship having an increased obtuse angle. Consequently, a larger mounting space is required.

The present invention was completed on the basis of the above conditions. An object of the present invention is to provide a small and lightweight sunshade actuation device.

SUMMARY OF THE INVENTION

As a way for achieving the above-mentioned objects, a first aspect of the present invention is a sunshade actuation device that comprises a screen, which is arranged in a condition of being wound around a winding device near a window. The screen can cover the window by drawing out an end portion in a predetermined direction while unwinding. In addition, the sunshade actuation device includes a guide body formed near the window so as to extend in the drawing direction of the screen, and an arm member, one end of which is connected to the screen and the other end of which extends so as to engage with the guide body in a relatively movable manner. The sunshade actuation device also includes a moving device, which is connected to the arm member, and causes the arm member to move relative to the guide body. The sunshade actuation device is characterized in that the guide body extends in a curved shape, and a mounting portion of the arm member to the screen pivots relative to an engaging part coupled with the guide body when the arm member moves along the guide body.

A second aspect of the present invention is a sunshade actuation device according to the first aspect. The sunshade actuation device of the second aspect is characterized by comprising an escape device for allowing the arm member to rotate in a direction away from the winding device when the arm member abuts against another member, causing the arm member to receive a load during motion towards the winding device.

A third aspect of the present invention is the sunshade actuation device according to the first aspect. The sunshade actuation device of the third aspect is characterized in that the arm member is formed of a moving part mounted to the screen, and an arm part engaging with the guide body while connected to the moving part. The moving part can move relative to the arm part so as to absorb any differences between a drawing center of the screen and a moving center of the mounting part of the arm member relative to the screen.

A fourth aspect of the present invention is the sunshade actuation device according to the first aspect. The sunshade actuation device is characterized in that the winding device has a mounting shaft fixed near the window, and a roller member, which is rotatably mounted to this mounting shaft. The screen is wound around the roller member. The roller member can move relative to the mounting shaft in an axial direction so as to absorb differences between a drawing center of the screen and a moving center of the mounting part of the arm member relative to the screen.

A fifth aspect of the present invention is the sunshade actuation device according to the first aspect. The sunshade actuation device of the fifth aspect is characterized in that the winding device includes a tapered roller member, which can rotate and around which the screen is wound. The outer diameters of either end of the tapered roller member are made correspondingly different so that a drawing center of the screen may follow a moving center of the mounting part of the arm member relative to the screen.

A sixth aspect of the present invention is the sunshade actuation device according to the first aspect. The sunshade actuation device of the sixth aspect is characterized in that the winding device includes a roller member, which can rotate and around which the screen is wound. The roller member can incline (pivot) in a drawing direction of the screen. This is so the drawing direction of the screen may correlate to the moving direction of the mounting part of the arm member relative to the screen.

The first aspect of the sunshade actuation device includes a structure in which the guide body extends in a curved shape, and the mounting part of an arm member to the screen pivots with respect to the engaging part interfacing with the guide body due to the arm member moving along the guide body. Consequently, it is possible to cause the arm member to rotate through the use of a single guide body. In addition, it is not only possible to broadly draw the screen out in comparison with the length of the guide body (i.e., the drawing length of the screen is greater than the sliding length of the guide body), but it is also possible to achieve a sunshade actuation device that is relatively small and lightweight.

The sunshade actuation device of the second aspect comprises an escape device for allowing the arm member to rotate in a direction away from the winding device when the arm member abuts against a foreign member so as to receive a load during movement toward the winding device. Therefore, it is possible to discharge or reduce the force against the foreign member even if the arm member becomes entangled during the winding motion.

In the sunshade actuation device of the third aspect, the arm member includes a moving part mounted to the screen. The arm part is engaged with the guide body while connected to the moving part. The moving part can move relative to the arm part so as to absorb differences between a drawing locus or center of the screen, and a moving locus or center of the mounting part of the arm member relative to the screen. As a result, it is possible to draw the screen out without generating wrinkles in the screen through the use of a relatively simple structure.

The sunshade actuation device of the fourth aspect includes a winding device that has a mounting shaft fixed near the window. The roller member is rotatably mounted to the mounting shaft. The screen is wound around the roller member. The roller member can move relative to the mounting shaft in an axial direction in order to absorb differences between a drawing locus of the screen and a moving locus of the mounting part of the arm member relative to the screen. Therefore, it is possible to draw the screen out without causing wrinkles in the screen through the use of a relatively simple structure.

The sunshade actuation device according to the fifth aspect includes a winding device that has a tapered roller member, which can rotate and around which the screen is wound. The outer diameters of the ends of the tapered roller member are configured correspondingly different so that a drawing center of the screen may follow a center locus of the mounting part of the arm member relative to the screen. Consequently, it is possible to draw the screen out and by using a relatively simple structure, simultaneously inhibit the generation of wrinkles in the screen.

The sunshade actuation device of the sixth aspect includes a winding device that includes the roller member, which can rotate and around which the screen is wound. The roller member can incline (pivot) in a drawing direction of the screen so that the drawing direction of the screen may correlate to a moving direction of the mounting part of the arm member relative to the screen. Therefore, it is possible to draw the screen out without generating wrinkles in the screen through the use of a relatively simple structure.

DETAILED DESCRIPTION OF THE PREFERRED EMBODIMENTS

Figure 1:
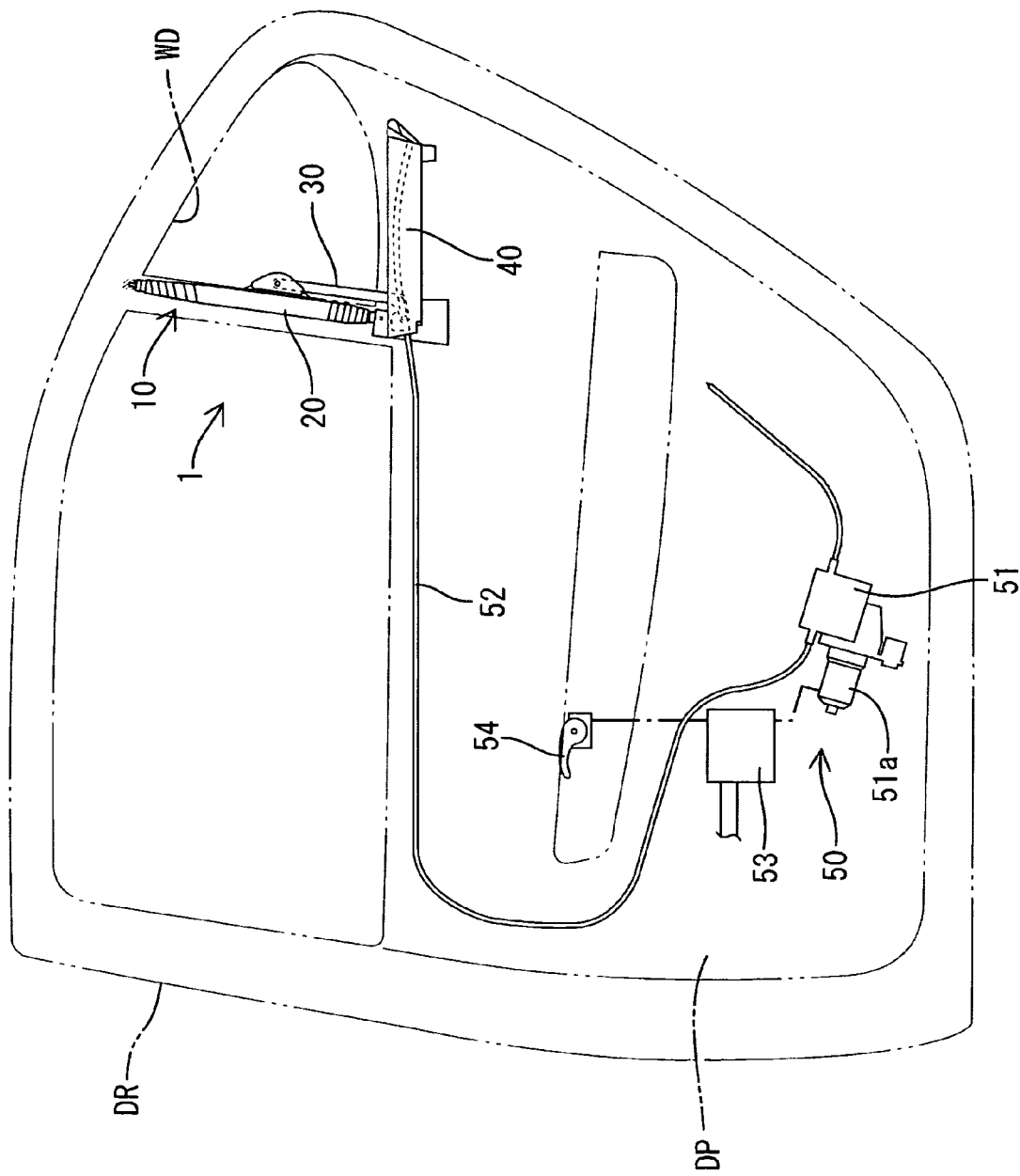
FIG. 1 is a diagram showing a mounting state of a sunshade actuation device according to an embodiment for a rear door.
Figure 2:
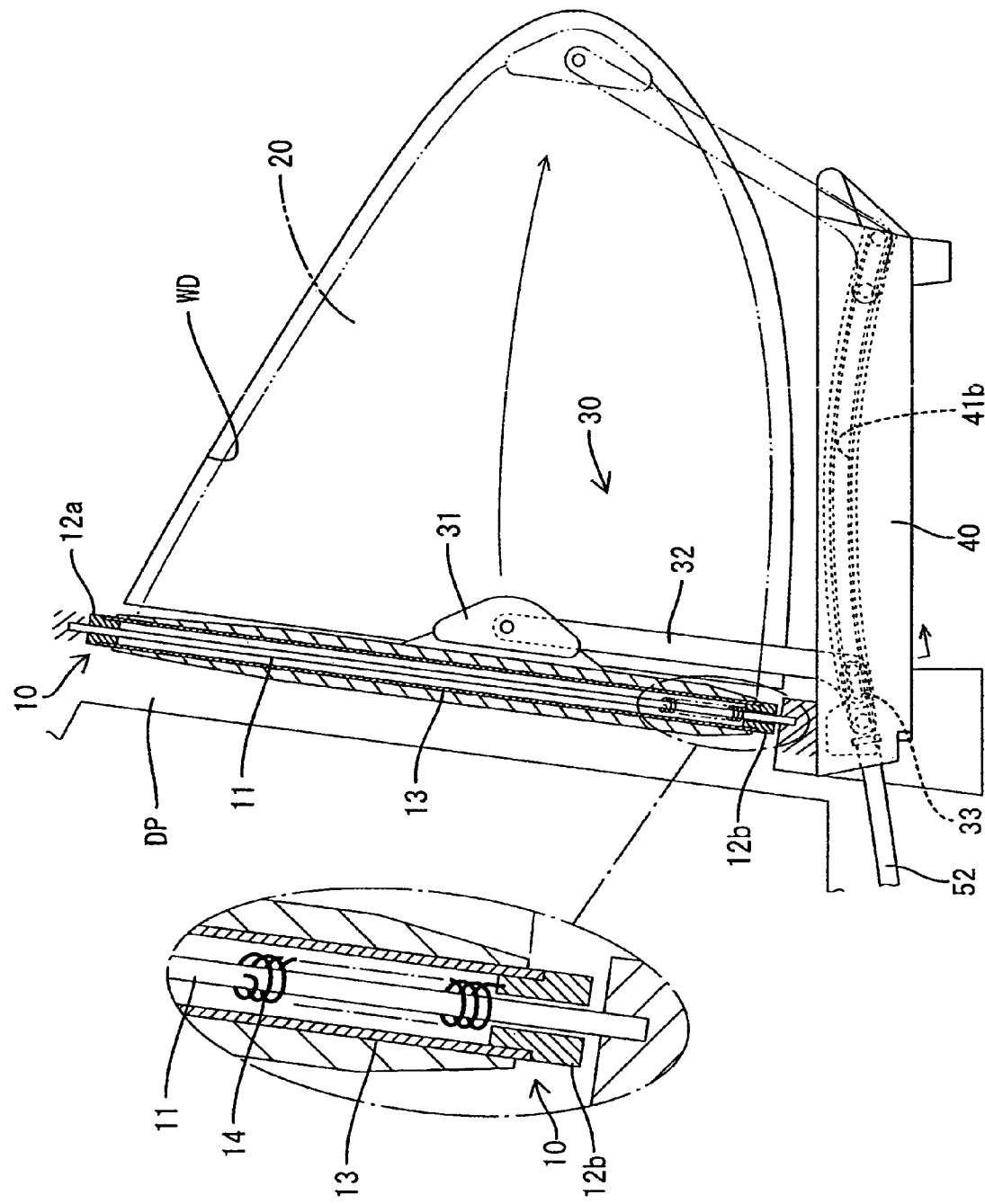
FIG. 2 is an enlarged diagram of some components of the sunshade actuation device according to the first embodiment.

A first embodiment of the present invention will be explained with reference to FIGS. 1 to 6. The left side of the FIG. 1 is referenced as the front in the explanations, the right side is the rear. As shown in FIG. 1, a sunshade actuation device 1 is mounted in a door panel DP, which constitutes a rear door DR of a vehicle. The sunshade actuation device 1 comprises a winder 10, a shade member 20, a swing arm device 30, a guide rail assembly 40, and an actuator device 50.

The winder 10 (see FIG. 2) (corresponding to an example of a winding device) is arranged proximate to (i.e., in front of) a rear quarter window WD (corresponding to an example of a window) of the rear door DR, and is fixed to the door panel DP. A pair of roller caps 12a and 12b is rotatably mounted to each end of a mounting shaft 11. The mounting shaft 11 is unrotatably fixed to the door panel DP so as to be located proximate to the quarter window WD. In addition, a roller sleeve 13 is integrated with the roller caps 12a and 12b, thereby connecting the roller caps 12a and 12b together. A pair of stoppers (not shown) is made to protrude in the upper and lower ends of the mounting shaft 11. An upper part of the roller cap 12a and a lower part of the roller cap 12b are respectively engaged with the pair of stoppers. Consequently, the roller caps 12a and 12b and the roller sleeve 13 are relatively fixed in an axial direction of the mounting shaft 11 in this embodiment. The roller sleeve 13, in which the roller caps 12a and 12b are mounted, corresponds to an example of the roller member of the present invention. Furthermore, one end of a volute spring 14 is fixed to the roller cap 12b, which is located below the spring 14, and the other end is fixed to the mounting shaft 11. The roller sleeve 13 along with the roller caps 12a and 12b, are in a constant state of being biased in a winding direction about the mounting shaft 11. This is due to the spring force of the volute spring 14. In addition, the spring force makes it possible to re-wind the shade member 20.

The wide end (i.e., front end) of the shade member 20 is connected to the outer periphery of the roller sleeve 13. The shade member 20 is wound around the outer periphery when the roller sleeve 13 rotates in response to the energizing force from the volute spring 14. The shade member 20, corresponding to an example of a screen, has elasticity and may be formed of a synthetic resin material or fiber that inhibits the transmission of light. The shade member 20 may be in a nearly triangular shape corresponding to the shape of the quarter window WD so as to substantially cover the quarter window WD. A connecting piece 31 (corresponding to an example of the moving part) is fixed to a drawn-out edge (i.e., the rear edge) of the shade member 20. The drawing arm 32 (along with a shoe 33 described later, corresponds to an example of the arm part) is pivotally connected to the connecting piece 31. The drawing arm 32 extends in a substantially vertical direction so as to connect the connecting piece 31 and shoe 33. All of these components together (connecting piece 31, drawing arm 32, and shoe 33) form the swing arm device 30, corresponding to an example of the arm member of the present invention.

Figure 3:
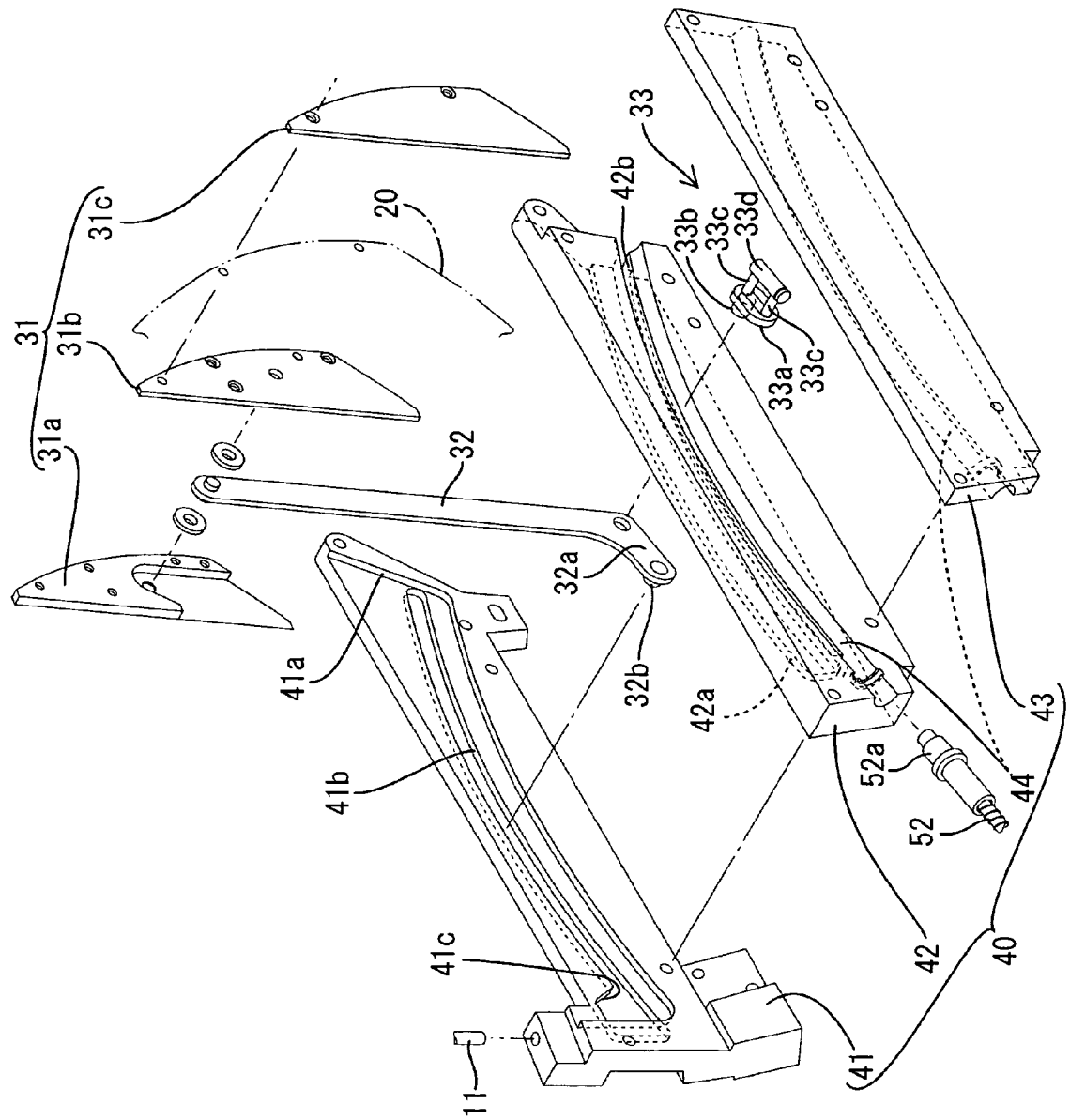
FIG. 3 is an exploded perspective view of the guide assembly and drawing arm shown in FIG. 2.

As shown in FIG. 3, the connecting piece 31 is formed from three sheet-shaped group pieces 31a, 31b, and 31c. The top of the drawing arm 32 is connected between the group pieces 31a and 31b. The drawn-out edge of the shade member 20 is sandwiched between the group pieces 31b and 31c. The drawing arm 32 is approximately formed in the shape of the character L. The shoe 33 is connected to a mounting body 32a of the bottom end of the drawing arm 32. The shoe 33 includes a flange section 33a and a slide portion 33b, which projects from one side face of the flange section 33a. The slide portion 33b is mounted so as to penetrate the drawing arm 32. The drawing arm 32 is rotatable relative to the shoe 33, centering about the slide portion 33b. On the other hand, a cylindrical connecting body 33d is connected to the other side face of the flange section 33a through a pair of bridges 33c.

Figure 4:
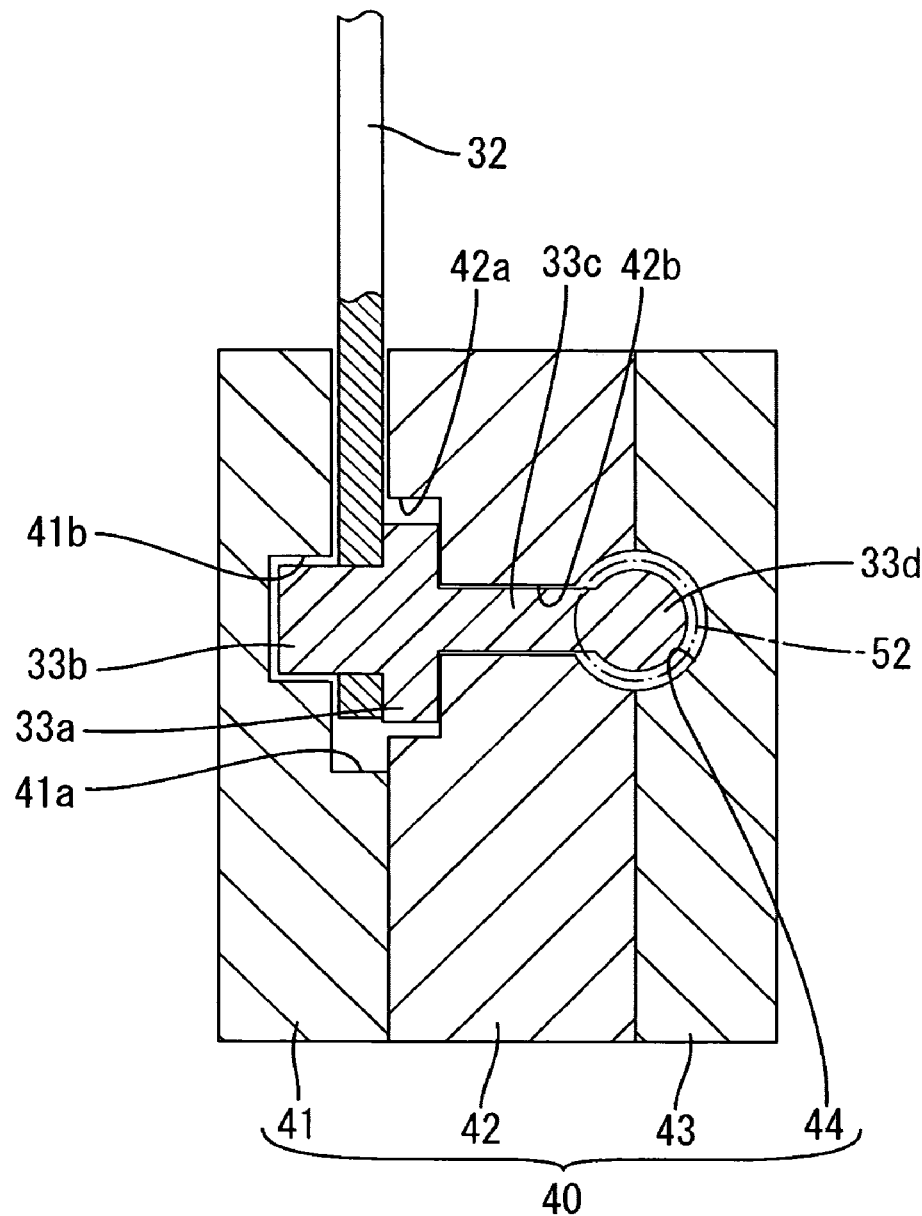
FIG. 4 is a sectional view of an engaging part of the shoe and guide assembly in FIG. 2.

As shown in FIG. 4, the shoe 33 is slidably contained within the interior of the guide rail assembly 40. The guide rail assembly 40 is fixed to the door panel DP so as to be arranged near the quarter window WD (lower part) such that the shade member 20 extends in the direction of being drawn out from the winder 10. The guide rail assembly 40 is constructed of a first guide 41, a middle guide 42, and a second guide 43. The drawing arm 32 is intermediately pivotally installed between the first guide 41 and middle guide 42. An arm groove 41a, allowing the drawing arm 32 to pivot, is formed in the first guide 41 so as to extend in a fore-and-aft direction. Furthermore, the side of the arm groove 41a is bored out, forming a regulatory groove 41b over the total length of the arm groove 41a. The slide portion 33b of the shoe 33 slidably engages the regulatory groove 41b together with a regulatory part 32b protruding from the mounting body 32a of the drawing arm 32.

On the other hand, a guide groove 42a, slidably containing the flange section 33a of the shoe 33 is formed in a face of the middle guide 42 opposite to the first guide 41. Grooves with semicircular cross-sections are respectively formed in opposing faces of the middle guide 42 and second guide 43, so as to directly oppose each other. Together these grooves form a cable passage 44 in which the connecting body 33d of the shoe 33 is slidably contained between guides 42 and 43. A guide slit 42b is formed in the middle guide 42. The guide slit 42b communicates the guide groove 42a to the cable passage 44 and contains the bridge 33c of the shoe 33. The regulatory groove 41b (corresponding to an example of the guide body), guide groove 42a, guide slit 42b, and cable passage 44, are all formed about the same locus. Together, they all extend in a fore-and-aft direction and curve substantially in the shape of a circular arc (i.e., curve) such that a central portion thereof rises upwards. In addition, an upward extension forms an escape chamber 41c in a front-end portion of the regulatory groove 41b.

A cable end 52a of a driving cable 52 is connected to the connecting body 33d of the shoe 33. The driving cable 52 can move within the interior of the cable passage 44 of the guide assembly 40. The driving cable 52 has gear teeth formed in an outer periphery of a known cable and is referred to as a geared cable. As shown in FIG. 1, after being routed along the door panel DP, the driving cable 52 is connected to an operating mechanism 51. The operating mechanism 51 is fixed to the door panel DP and equipped with an electric motor 51a and an output gear. The output gear is connected to the electric motor 51a through a reducer (not shown). The driving cable 52 engages with the output gear of the operating mechanism 51. The electric motor 51a of the operating mechanism 51 is electrically connected to a control box 53 fixed to the door panel DP. The electric motor 51a is connected to a vehicle battery through the control box 53. Furthermore, a control switch 54, mounted on the not-shown door trim of the rear door DR, is electrically connected to the control box 53. Together, the operating mechanism 51, driving cable 52, control box 53, and control switch 54, constitute an actuator device 50. The actuator device 50 corresponds to an example of the moving device of the present invention.

Figure 5:
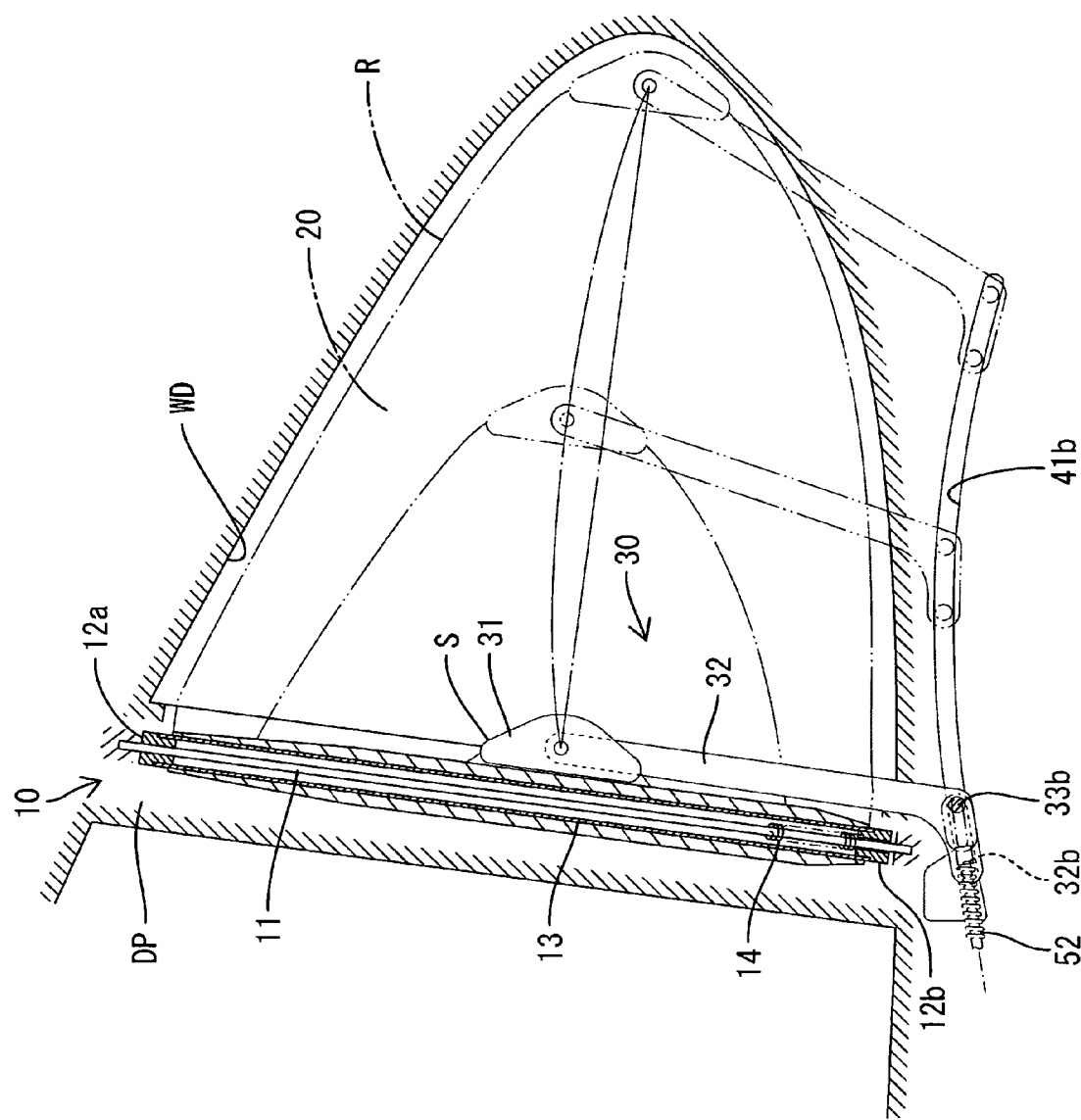
FIG. 5 is a diagram showing a moving state of the drawing arm shown in FIG. 2.

When the shade member 20 is wound by the winder 10 (i.e., the window is uncovered), a rear seat passenger of the vehicle may operate the control switch 54 so as to draw the shade member 20 out from a state of not covering the quarter window WD (S in FIG. 5). An operation signal is sent to the control box 53 from the control switch 54. The control box 53 receives the operation signal and sends a drive signal to the electric motor 51a of the operating mechanism 51, activating the electric motor 51a. When the electric motor 51a is activated, the output gear of the operating mechanism 51 rotates to send the driving cable 52 out toward the guide assembly 40. In response to the motion of the driving cable 52, the shoe 33, which is connected to the driving cable, is moved inside of the guide assembly 40 to the rear. Therefore, the drawing arm 32 connected to the shoe 33 moves back across the quarter window WD, draws the shade member 20 out from the winder 10, and unwinds the shade member 20 by overcoming the spring force of the volute spring 14. It is then possible to cover the quarter window WD with the shade member 20. The shoe 33, moving to the rear inside of the guide assembly 40, stops by abutting against the end portions of the regulatory groove 41b, guide groove 42a, and the like, so as to cease moving. As a result, the control box 53 detects the load current of the electric motor 51a and stops the electric motor 51a. The swing arm device 30 holds the shade member 20 in a condition of covering the quarter window WD (R in FIG. 5).

As mentioned above, the regulatory groove 41b in the guide assembly 40 extends in the fore-and-aft direction while curving around a substantially circular arc. For this reason, the regulatory part 32b of the drawing arm 32 and the slide portion 33b of the shoe 33 move together, spaced apart by a predetermined distance while engaging the regulatory groove. Therefore, the drawing arm 32 can move with the connecting piece 31 of the drawing arm 32, pivoting in a fore-and-aft direction about the shoe 33 by following the contour of the regulatory groove 41b. Thus, it is possible to increase the drawing length of the shade member 20 due to the pivoting of drawing arm 32, relative to the length of the guide assembly 40 including the regulatory groove 41b. Consequently, it is possible to cover the rear part of the quarter window WD with the shade member 20.

When a rear seat passenger operates the control switch 54 so as to wind the shade member 20, the control box 53 activates the electric motor 51a of the operating mechanism 51 in the direction opposite to the previously-mentioned case. The driving cable 52 is pulled in the direction of the operating mechanism 51 via the operation of the electric motor 51a. The shoe 33, which is connected to the driving cable 52, is moved forward inside of the guide assembly 40. Further, the drawing arm 32, connected to the shoe 33, moves the rear portion of the shade member 20 towards the front. This allows the winder 10 to wind the shade member 20. The shoe 33, moving inside of the guide assembly 40, stops by abutting against the front portions of the regulatory groove 41b, guide groove 42a, and the like, so as to cease moving. The control box 53 then detects the increased load current of the electric motor 51a and stops the operation of the electric motor 51a.

As shown in FIG. 5, when the shade member 20 is drawn out from the winder 10 or is wound by the winder 10, the rear portion of the shade member 20 is configured to move linearly relative to the winding of the winder 10. Conversely, since the connecting piece 31, connected to the rear portion of the shade member 20, is connected to the drawing arm 32, the moving locus of the connecting piece 31 follows a curve. Although there is a mismatch of the moving loci between the respective components, in this embodiment the shade member 20 is formed with an expandable material. Therefore, the rear portion of the shade member 20 absorbs the mismatch of the loci between the respective components when following the moving locus of the connecting piece 31.

Figure 6:
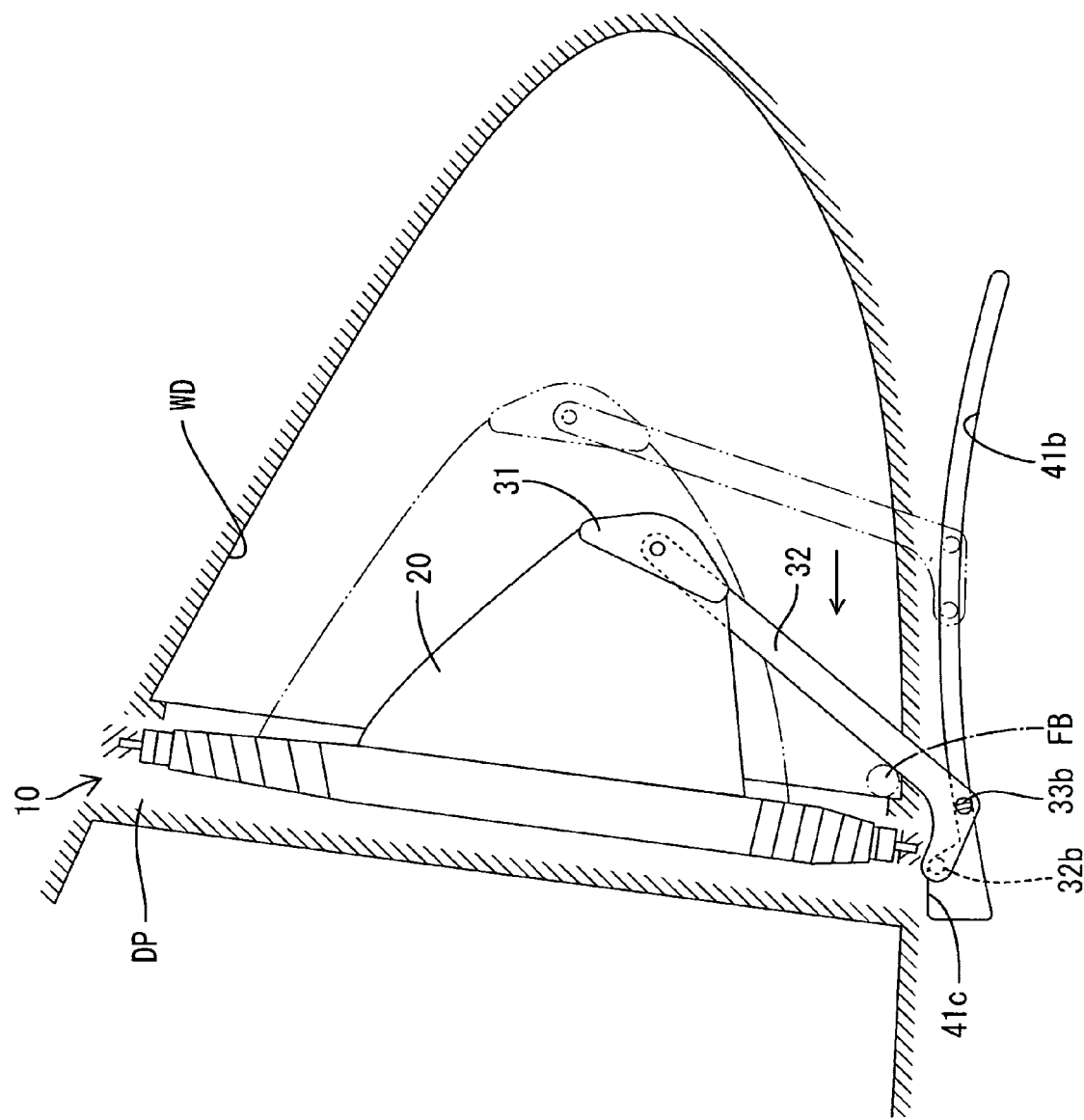
FIG. 6 is a diagram showing a state in which the drawing arm abuts upon a foreign material.

As shown in FIG. 6, when the drawing arm 32 abuts against a foreign material FB during the moving of the drawing arm 32 toward the winder 10 (i.e., the winder 10 is winding up the shade member 20 from a previous quarter window WD covering position), the drawing arm 32 receives a load from a foreign material FB. As previously described, the escape chamber 41c, which has a relatively large area, is provided in the front-end portion of the regulatory groove 41b of the guide assembly 40. Therefore, when the drawing arm 32 receives a load from the foreign material FB, the regulatory part 32b of the drawing arm 32 enters into the escape chamber 41c due to the tension from the driving cable 52. The drawing arm 32 pivots back about the slide portion 33b of the shoe 33, causing the connecting piece 31 to move away from the winder 10. This action can prevent the drawing arm 32 from holding or exerting a high level of force against a foreign material during the winding of the shade member 20. In addition, the escape chamber 41c corresponds to an example of the escape device of the present invention.

This embodiment has a structure in which the regulatory groove 41b circularly extends in a fore-and-aft direction. When the shoe 33 moves within the regulatory groove 41b, the drawing arm 32 moves while the connecting piece 31 pivots about the shoe 33. Therefore, it is possible to cause the drawing arm 32 to pivot with a single regulatory groove 41b. It is also possible to relatively broadly draw the shade member 20 out in comparison to the length of the regulatory groove 41b. In addition, the environment of the regulatory groove 41b does not become dead space. Consequently, it is possible to realize a small and lightweight sunshade actuation device. Furthermore, when the drawing arm 32 abuts on another member and receives an unexpected load during motion towards the winder 10, it is possible to move the drawing arm 32 away from the winder 10 due to the regulatory part 32b of the drawing arm 32 entering into the escape chamber 41c. In such a case, the drawing arm 32 rotates back about the slide portion 33b of the shoe 33. As a result, it is possible to discharge or release abutted foreign material even if the drawing arm 32 entangles with the foreign material during winding motion.

Figure 7:
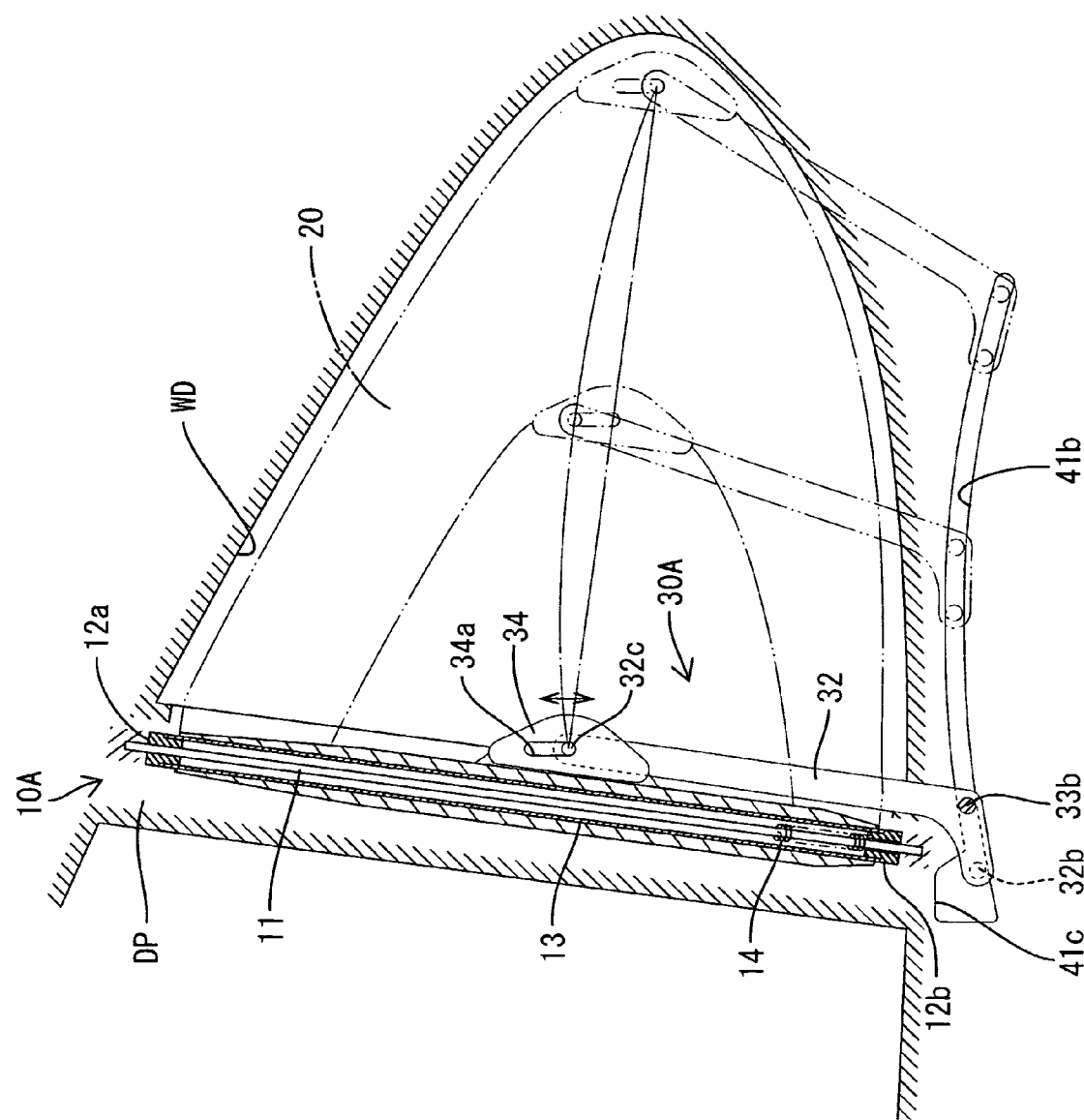
FIG. 7 is an enlarged diagram of some components of a sunshade actuation device according to a second embodiment.

A second embodiment of the present invention will be explained next with reference to FIG. 7. In a connecting piece 34 (corresponding to an example of the moving part of the present invention) of the swing arm device 30a of this embodiment, an elongated hole 34a extends in an approximately vertical direction. Further, by inserting a rotation pin 32c within this elongated hole 34a, the drawing arm 32 is rotatably connected to the connecting piece 34. Thus, the connecting piece 34 can move relative to the drawing arm 32 in the vertical direction. The difference between the drawing locus of the rear portion of the shade member 20, when the shade member 20 is drawn out from the winder 10 or is wound by the winder 10, and the moving locus of the connecting piece 34, is absorbed by the vertical movement. Therefore, it becomes possible to draw the shade member 20 out, without the generation of wrinkles, through the use of a relatively simple structure.

Figure 8:
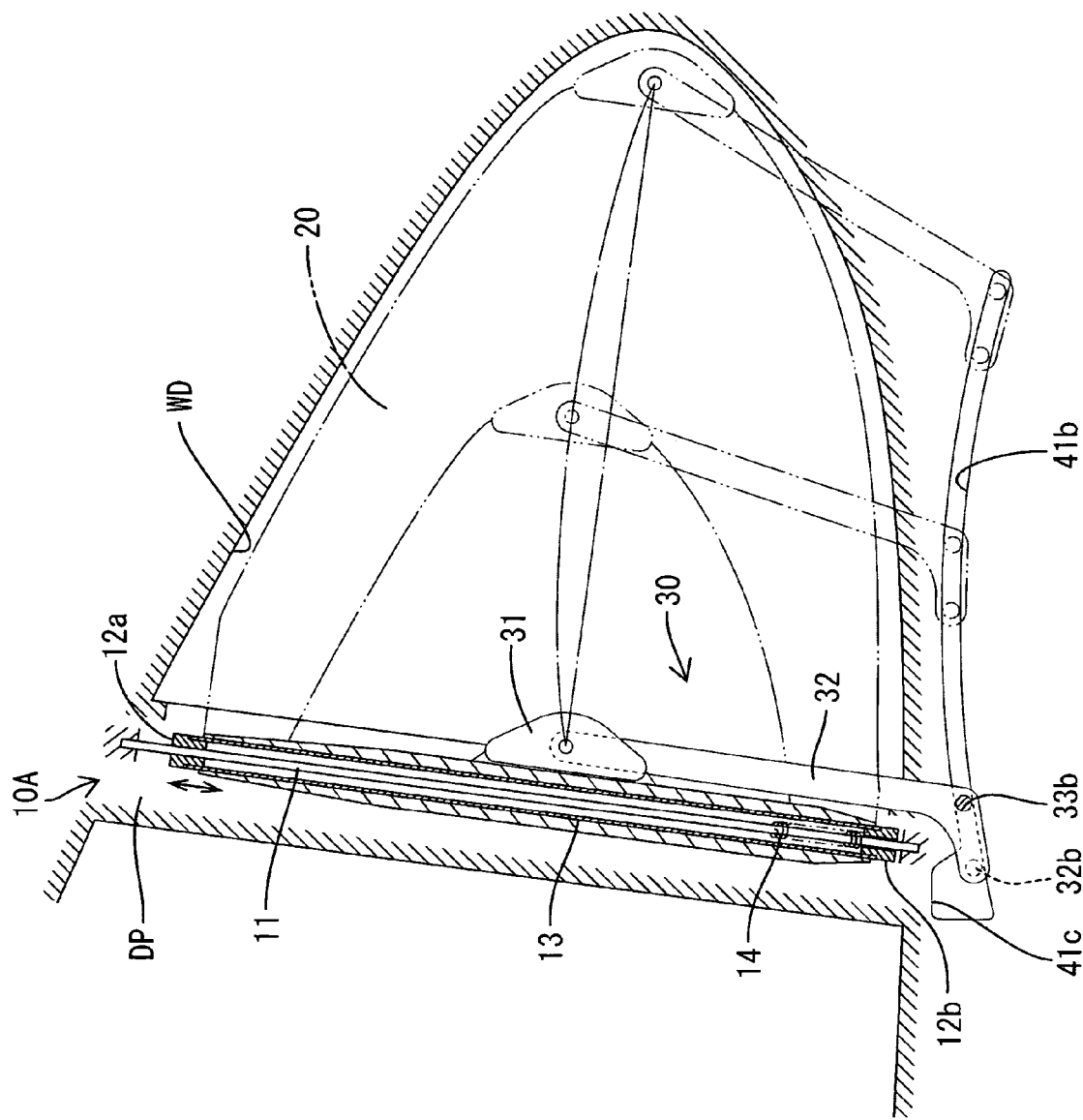
FIG. 8 is an enlarged diagram of some components of a sunshade actuation device according to a third embodiment.

FIG. 8 shows a third embodiment of the present invention. In this embodiment, the roller caps 12a and 12b and the roller sleeve 13 of a winder 10A are made movable in an axial direction relative to the mounting shaft 11. The roller caps 12a and 12b and the roller sleeve 13 are hung from the mounting shaft 11 by the volute spring 14, intermediately installed between the mounting shaft 11 and the roller cap 12b. Therefore, the roller sleeve 13 can move relative to the mounting shaft 11 in an axial direction (i.e., a vertical direction as viewed in FIG. 8) due to an adequate load. The difference between the drawing locus of the rear portion of the shade member 20, when the shade member 20 is drawn out from the winder 10A or is wound by the winder 10A, and the moving locus of the connecting piece 31, can be absorbed by the vertical movement of the roller sleeve 13. Consequently, it becomes possible to draw the shade member 20 out, without the generation of wrinkles, through the use of a relatively simple structure.

Figure 9:
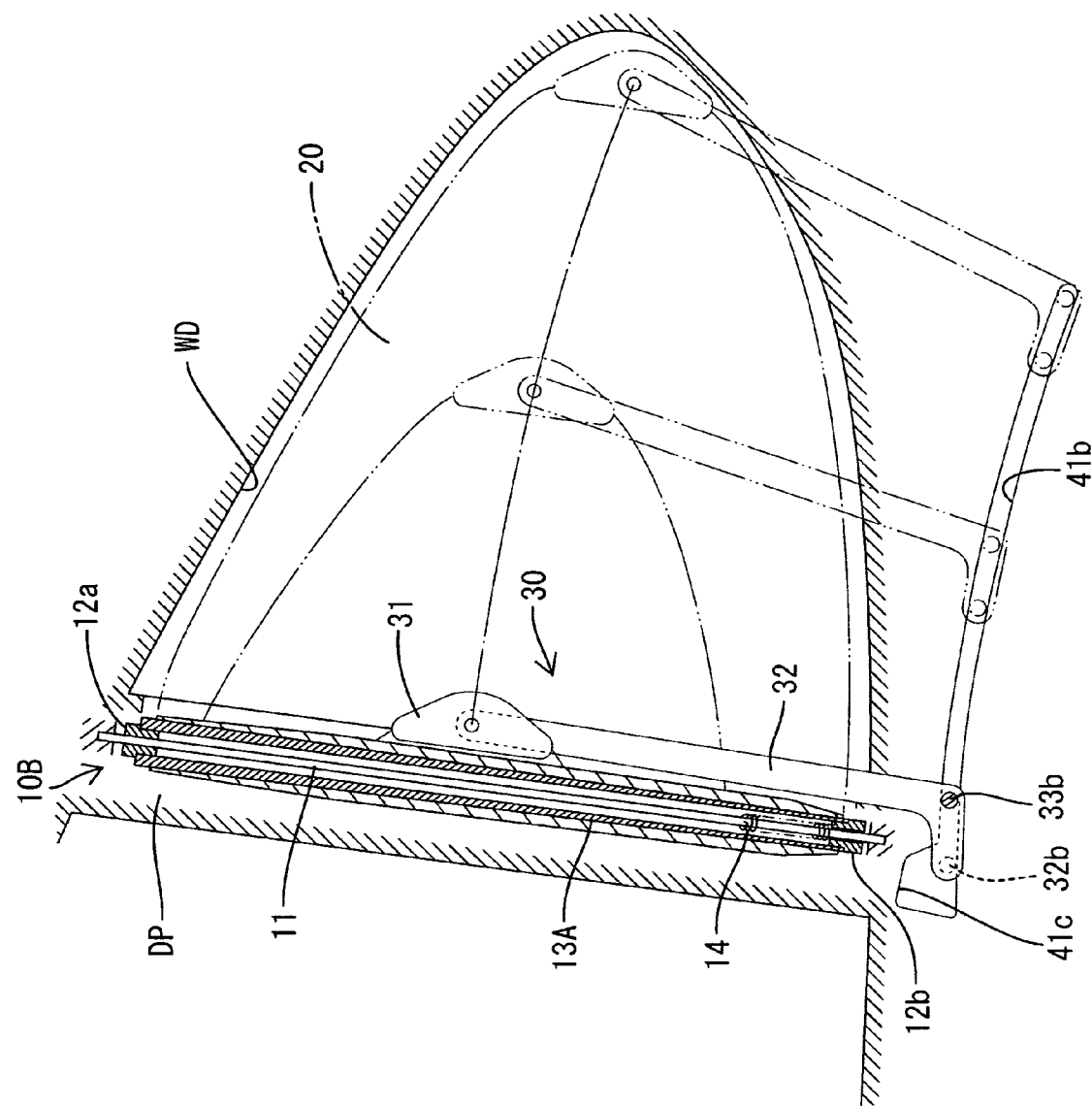
FIG. 9 is an enlarged diagram of some components of a sunshade actuation device according to a fourth embodiment.

FIG. 9 shows a fourth embodiment of the present invention. In this embodiment, the outer diameter of a top end of a roller sleeve 13A of a winder 10B is enlarged in comparison with an outer diameter of the bottom end of the roller sleeve 13A. Consequently, the outer periphery of the roller sleeve 13A is formed with a tapered shape. As a result, a drawing locus of a rear portion of the shade member 20, when the shade member 20 is drawn out from the winder 10B is wound by the winder 10B, follows a curved shape so as to correspond to the moving locus of the connecting piece 31. Therefore, it becomes possible to draw the shade member 20 out, without generating wrinkles in the shade member 20, through the use of a relatively simple structure.

Figure 10:
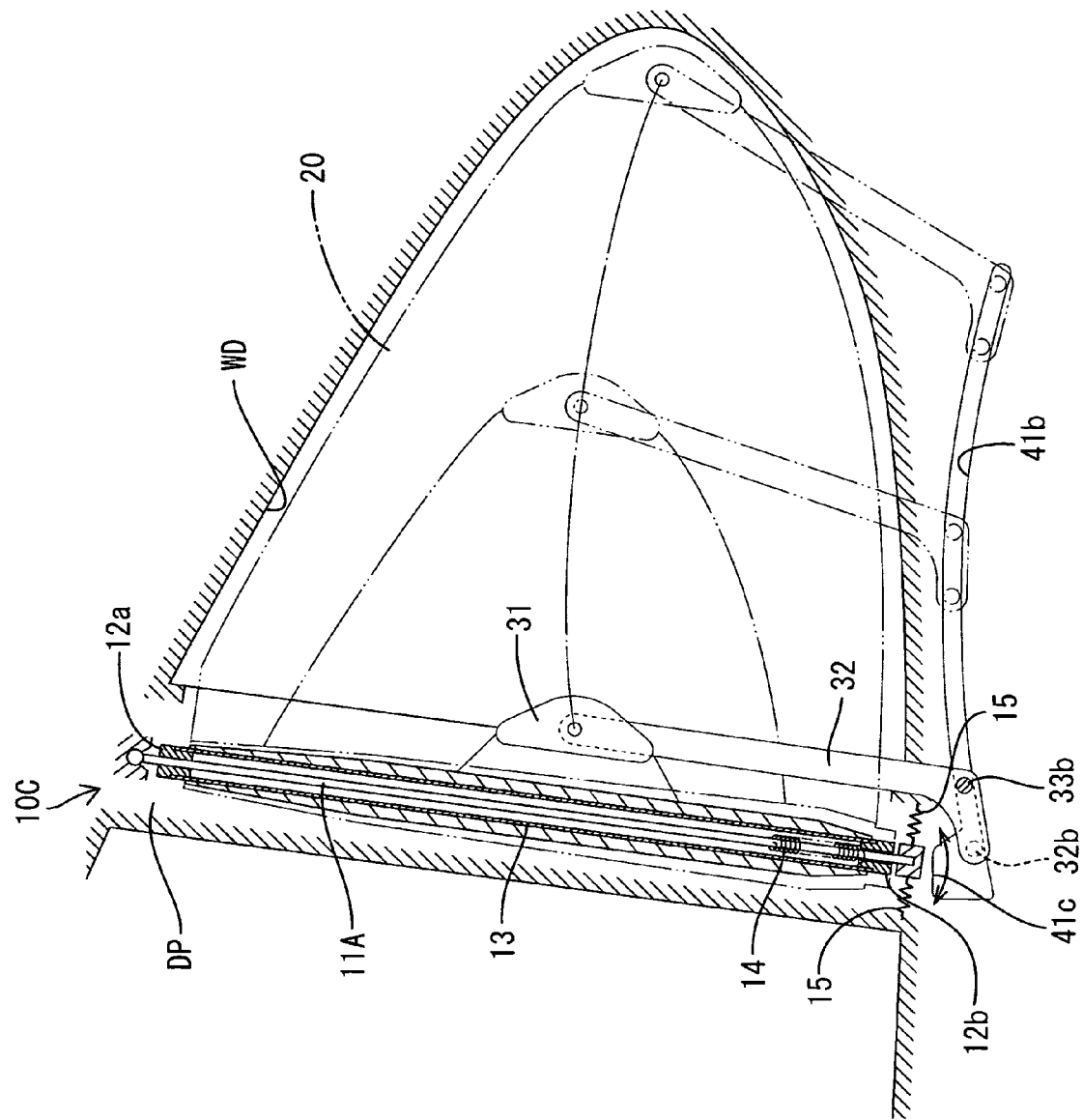
FIG. 10 is an enlarged diagram of some components of a sunshade actuation device according to a fifth embodiment.

FIG. 10 shows a fifth embodiment of the present invention. In this embodiment, a mounting shaft 11A of a winder 10C is pivotally mounted to the door panel DP by using the top end of the mounting shaft 11A as a fulcrum. The bottom end of the mounting shaft 11A is mounted to the door panel DP in a fore-and-aft direction through a pair of tension springs 15. As a result, the roller sleeve 13 of the winder 10C can incline about the top end of the mounting shaft 11A relative to a drawn-out direction of the shade member 20 (a left to right direction in FIG. 10) due to an adequate load. Consequently, a draw-out direction of a rear portion of the shade member 20, when the shade member 20 is drawn out from the winder 10C or is wound by the winder 10C, correlates to the moving direction of the connecting piece 31 by following a curvature. Thus, it becomes possible to draw the shade member 20 out, without the generation of wrinkles, through the use of a relatively simple structure.

The present invention is not limited to the embodiments explained with the previously-detailed description and drawings. For example, the following embodiments are also included in the technical scope of the present invention. Further, the present invention can be variously modified and implemented within the scope of the disclosure in addition to the following examples.

(1) The regulatory groove 41b, in which the shoe 33 moves while engaging, is not required to be circular. The regulatory groove 41b can be formed to follow a variety of appropriate forms.

(2) In order to stop the operation of the electric motor 51a of the operating mechanism 51, a limit switch may be provided for the moving drawing arm 32 to abut against. The operation stop may be performed by a signal generated by the limit switch. Alternatively, a pulse encoder may be embedded with the electric motor 51a and the operation stop may be performed on the basis of the rotation of the electric motor 51a, as detected by the pulse encoder.

(3) When the drawing arm 32 abuts against a foreign material and cannot continue to move during the time in which the winder 10 is winding the shade member 20, it is sufficient to reverse the moving direction of the drawing arm 32 (i.e., away from the winder 10). This may be accomplished by reversing the rotation direction of the electric motor 51a after the detection of an increase in the load current of the electric motor 51a.

(4) It is also sufficient to make the shoe 33 movable on the guide assembly 40 by providing a protrusion extending in the drawn-out direction of the shade member 20 in a side of the guide assembly 40, and forming an engaging groove in a side of the shoe 33 for slidably connecting with the protrusion.

(5) The sunshade actuation device of the present invention can be applied to all of the windows of a vehicle in addition to or instead of a rear quarter window. The sunshade actuation device is also suitable for residential windows.

What is claimed is:

1. A sunshade actuation device, comprising:
   a screen wound around a winding device proximate to a window, wherein the screen substantially covers the window when unwound, substantially uncovers the window when wound;
   an elongated guide body formed proximate to the window so as to longitudinally extend in a drawing direction of the screen;
   an arm member including a first end connected to the screen, and a second end slidably engaged with the guide body; and
   a moving device connected to the second end of the arm member and causing the arm member to move along the guide body;
   wherein the elongated guide body longitudinally extends in the drawing direction of the screen and curves substantially in the shape of a circular arc such that a central portion of the guide body rises upward; and
   wherein a mounting part of the first end of the arm member to the screen pivots relative to an engaging part of the second end of the arm member as the arm member moves along the guide body.

2. The sunshade actuation device according to claim 1, further comprising an escape device for allowing the arm member to rotate in a direction away from the winding device when the arm member abuts against a foreign member so as to receive a load, during motion of the arm member towards the winding device.

3. The sunshade actuation device according to claim 1, wherein the arm member comprises:
   a moving part mounted to the screen; and
   an arm part engaging with the guide body while being connected to the moving part;
   wherein the moving part can move relative to the arm part.

4. The sunshade actuation device according to claim 1, wherein the winding device includes:
   a mounting shaft fixed proximate to the window; and
   a roller member rotatably mounted to the mounting shaft;
   wherein the roller member can move relative to the mounting shaft in an axial direction.

5. The sunshade actuation device according to claim 1, wherein the winding device has a tapered roller member around which the screen is wound.

6. The sunshade actuation device according to claim 1, wherein the winding device has a roller member around which the screen is wound; and
   wherein the roller member can pivot about a point proximate to one end of the roller member.

7. A sunshade actuation device, comprising:
   a screen wound around a winding device and located proximate to a window, wherein the screen substantially covers the window in an unwound state, and substantially un-covers the window in a wound state;
   a guide body formed proximate to the window so as to extend in a drawing direction of the screen;
   an elongated guide body formed proximate to the window so as to longitudinally extend in a drawing direction of the screen along a side of the window;
   an arm member including a screen end connected to the screen, and a guide body end slidably engaged with the guide body and movable relative thereto; and
   a moving device connected to the arm member for causing the arm member to move along the guide body; and
   an escape device causing the arm member to rotate in a direction away from the winding device when the arm member abuts against a foreign member so as to receive a load, during motion of the arm member towards the winding device;
   wherein the elongated guide body longitudinally extends in the drawing direction of the screen and curves substantially in the shape of a circular arc such that a central portion of the guide body rises upward; and
   wherein a mounting part of the arm member pivotally connected to the screen pivots relative to an engaging part engaged with the guide body when the arm member moves along the guide body.

8. The sunshade actuation device according to claim 7, wherein the arm member comprises:
   a moving part mounted to the screen; and
   an arm part engaging with the guide body while connected to the moving part;
   wherein the moving part can move relative to the arm part.

9. The sunshade actuation device according to claim 7, wherein the winding device includes:
   a mounting shaft fixed proximate to the window; and
   a roller member rotatably and resiliently mounted to the mounting shaft;
   wherein the screen is wound around the roller member; and
   wherein the roller member can move relative to the mounting shaft in an axial direction.

10. The sunshade actuation device according to claim 7, wherein the winding device includes:
    a tapered roller member around which the screen is wound;
    wherein a first outer diameter of a first end of the tapered roller is not equal to a second outer diameter of a second end of the tapered roller.

11. The sunshade actuation device according to claim 7, wherein the winding device includes:
    a roller member around which the screen is wound;
    wherein the roller member can pivot along the drawing direction of the screen about a point proximate to a first end of the roller member or a second end of the roller member.

* * * * *